2 Sheets—Sheet 1.

J. R. CLARK.
Muffle-Furnace.

No. 218,489. Patented Aug. 12, 1879.

Witnesses
Geo. H. Strong
Frank N. Brooks

Inventor
James R. Clark
By Dewey & Co.
attys

2 Sheets—Sheet 2.

J. R. CLARK.
Muffle-Furnace.

No. 218,489. Patented Aug. 12, 1879.

Witnesses
Geo. H. Strong.
Frank N. Brooks

Inventor
James R. Clark
By Duvey & Co

UNITED STATES PATENT OFFICE.

JAMES R. CLARK, OF SAN FRANCISCO, CALIFORNIA, ASSIGNOR OF ONE-HALF HIS RIGHT TO FREDERICK C. L. KURRE, OF SAME PLACE.

IMPROVEMENT IN MUFFLE-FURNACES.

Specification forming part of Letters Patent No. 218,489, dated August 12, 1879; application filed April 29, 1879.

*To all whom it may concern:*

Be it known that I, JAMES ROBERT CLARK, of the city and county of San Francisco, and State of California, have invented an Improved Muffle-Furnace; and I hereby declare the following to be a full, clear, and exact description thereof, reference being made to the accompanying drawings.

My invention relates to an improved furnace for roasting ores; and my improvements consist in providing a series of muffles communicating with each other, the fire from the fire-place passing between the hearth of one and arch of the other on its way to the stack, so that, although the ore is roasted, it is nowhere in the presence of the flames.

It further consists in connecting with the furnace a series of tubs or vats for holding ore, into which chlorine, generated in the furnace while the ore is roasting, is led. These tubs or vats are provided with pumps for circulating the liquor and passing it through and through the ore as fresh chlorine is continuously added from the furnace.

It further consists in certain details of construction and operation, as is more fully described in the accompanying drawings, in which—

Figure 1:
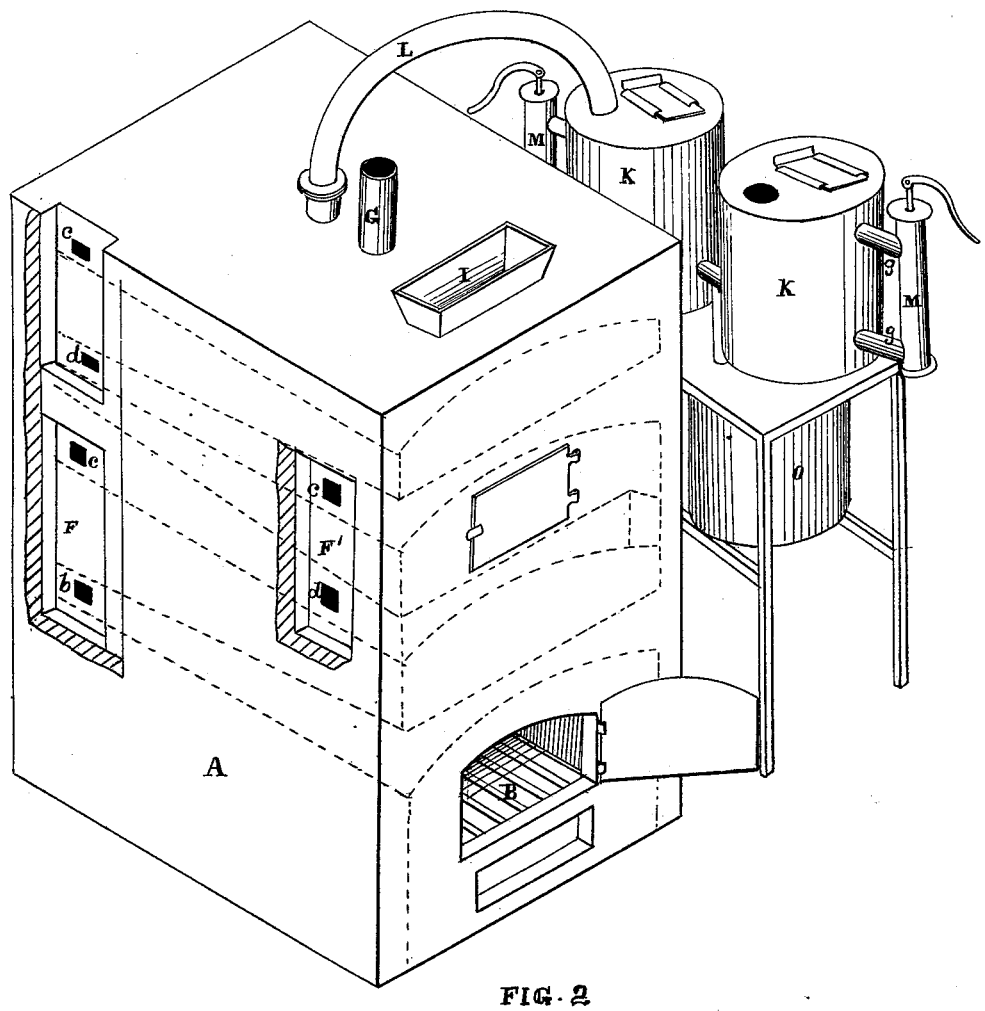
Figure 2:
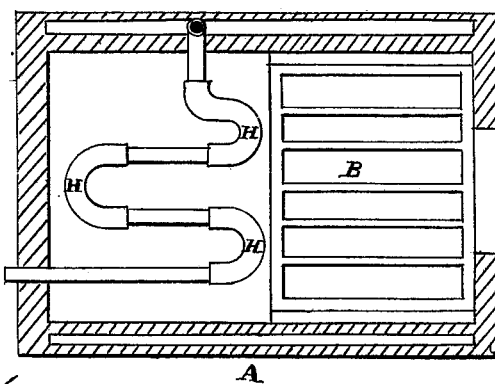
Figure 3:
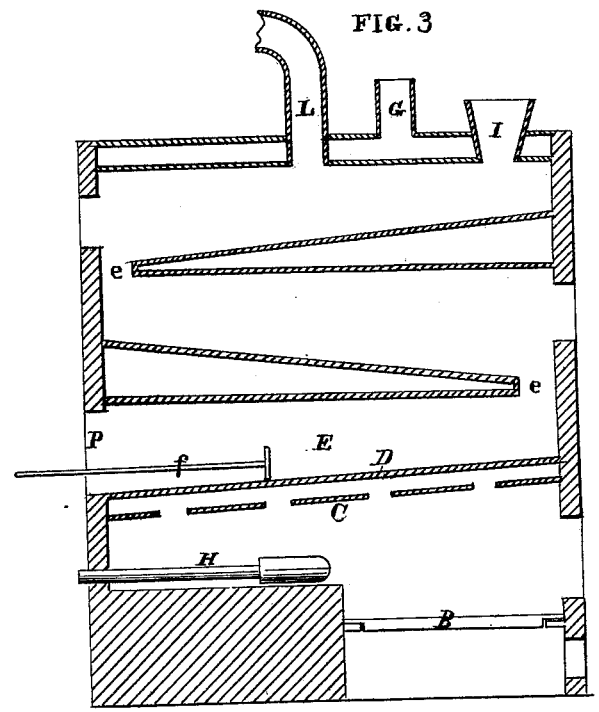
Figure 4:
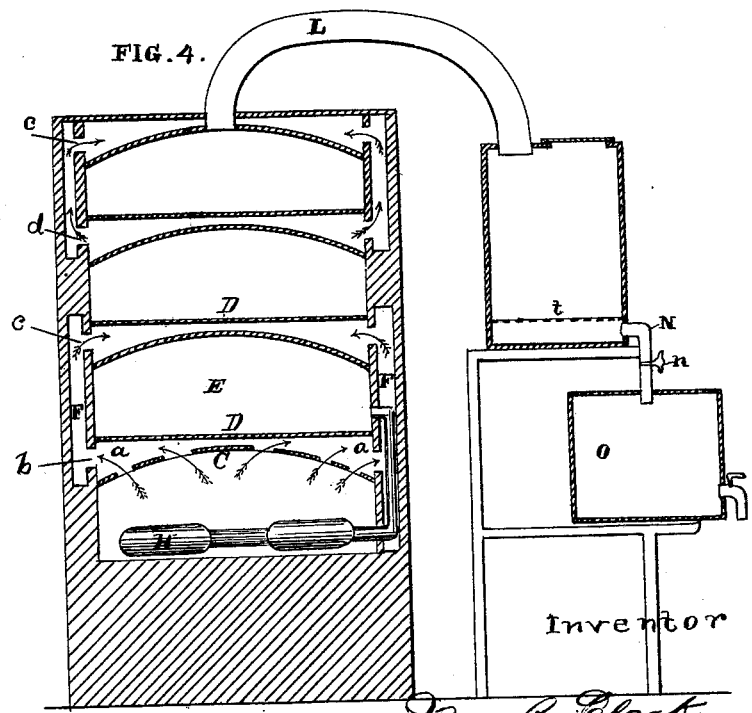

Figure 1 is a perspective view. Fig. 2 is a horizontal section. Fig. 3 is a longitudinal vertical section. Fig. 4 is a transverse vertical section.

The side walls of the furnace A are made double, as shown. The fire-place B is made at the bottom of the furnace, and is provided with the usual grate, feed-door, and ash-door. The arch C immediately over the fire-place is perforated, so as to allow the heat and flame and products of combustion to pass through the perforations into the space $a$ between the arch C and the hearth D of the muffle E above.

The fire-place is entirely inclosed, and there is no outlet for the products of combustion except through these perforations in the arch. As these products of combustion enter the space $a$ they heat the hearth above, and pass from it through openings $b$ into the flues F, one of which is provided at two opposite corners of the same end of the furnace, each having a corresponding opening, $b$. On entering the flues F they again come inward through the openings $c$ into a space between the arch of the first and floor of the second muffle. The arch of the first muffle is not perforated like that of the fire-place, and the heat comes into it through the openings $c$, as shown. The heat and products of combustion pass along through this space and out of the openings $d$ into the flues F', thence upward into inlet-openings $c$, into the space between the arch of the second and hearth of the third muffler. They pass out of this space in the same manner into the flue F at the other end and up into the space above the arch of the upper furnace, thence passing into the stack G. One of the flues F F' is placed at each corner of the furnace, and the openings $b\ c\ d$ leading into and out of the flues correspond at the same ends on opposite sides. In this way the hearth and arches of each muffle-furnace are heated all by the same fire, while no fire or products of combustion come in direct contact with the ore on said hearths.

Each of the hearths E is alternately inclined in an opposite direction from the next, and the lower end of each does not quite come to the end wall of the furnace; but a space, $e$, is left at the lower end, through which heated air, fumes, and chlorine gas may rise from one muffle to the other, as hereinafter described.

In the fire-place is placed a heater-coil, H, by which air or steam is heated and forced by suitable means, through the pipe $h$, to move the ore on the hearths from one to the other. This blast of heated air or steam blows the ore along down the inclined hearth until it drops through the space $e$ to the next hearth below, where it is again moved by another blast from the same heater. In case, however, power enough is not available to move the ore, hand-sweepers $f$ may be used, or other means employed to move the ore from one hearth to the other. The ore is fed onto the first hearth through the hopper I on top of the furnace, and is drawn off through a door, P, at the lower end of the bottom hearth when suitably roasted.

The furnace may have as many separate muffles as desired. All the heat is consumed, as the flue of every alternate hearth has its own channel, the heat passing over the arch of one muffle and under the hearth of the next at the same time. The fire is excluded from the muffles completely; but at the same time all the heat is utilized. The ore is worked gradually down to the last hearth, where it is discharged at a high heat, having been gradually heated more and more in its passage.

Communicating with the upper one of the series of muffles is a curved pipe, L, which leads to the leaching-tub K, two of which are mounted on suitable frame-work near the furnace. The pipe L is led into the upper end of one of these tubs, into which a charge of ore from the furnace has previously been placed, and the chlorine generated in the furnace, as hereinafter described, comes through the pipe L into the ore in the tub.

A pump, M, on the side of the tub, and communicating with it above and below by means of the pipe $g$, serves to keep the liquor which condenses in the tub moving through and through the ore, being drawn from beneath and again introduced above.

A screen or perforated false bottom, $t$, covered with some textile fabric, is placed at the lower part of the tub, and the lower pipe leading to the pump comes in under this screen. A cover on top of the tub closes over the charging-hole when the charge is once in.

A pipe, N, having cocks $n$, leads the liquor off to the settling-tub O. The tubs K are made in pairs, as many as necessary, and they are alternately charged with chlorine from the furnace by turning the pipe L from one to the other. In this way the process is continuous, for while one batch of ore is being charged with chlorine the other tub may be emptied by a suitable man-hole and again charged. Each tub may be disconnected or connected with the settler by means of the cock $n$ in the pipe N.

In order to generate the chlorine after the muffles are heated to a high redness and steam is admitted through the pipe H, I add chloride of sodium and silicious sand with a quantity of black oxide of manganese. The chlorine gas, which is set free in the chemical changes which take place in the presence of the heat, passes out through the pipe L, and is utilized in the leaching-tubs. The sodium combines with the oxygen of the steam and the silica or silicious acid to form silicate of soda. These chemicals are charged into the upper muffle through the hopper with some of the ore.

In this way I roast the ores preparatory to leaching, and at the same time generate the chlorine by the same fires, so that the chlorine is used immediately in the tubs on the ore, drawn from the furnace.

By admitting the chlorine at the top of the ore in the tub, and pumping the liquor through and through it, I can leach through a thick mass of ore. Usually the chlorine is admitted at the bottom and has to rise through the ore. In my apparatus there is a continual wash in the ore, the fresh chlorine continuously passing through the ore from the furnace, and the liquor being repeatedly passed through the ore with it.

Having thus described my invention, what I claim as new, and desire to secure by Letters Patent, is—

1. The furnace A, having the muffles E, arranged as shown and described, so as to roast the ore out of direct contact with the fire, the upper one being provided with the pipe L, for carrying the chlorine, in combination with the leaching-tubs K, with their false bottoms $t$, pumps M, and discharge-pipes N, leading to the settling-tubs, whereby the chlorine may be generated in the furnace while the ore is being roasted, and conveyed direct in a continuous fresh stream to the ore in the tubs, substantially as herein described.

2. The tubs K, provided with false bottoms $t$, pumps M, pipes $g$ N, and cocks $n$, in combination with furnace A and pipe L, said pipe connecting the tops of furnace and tubs, by which means fresh chlorine is continually added and the liquor repeatedly passed through the ore from above downward, substantially as and for the purpose herein described.

In witness whereof I have hereunto set my hand.

JAMES ROBERT CLARK.

Witnesses:
   CHAS. G. YALE,
   S. H. NOURSE.